(12) United States Patent
Marquette et al.

(10) Patent No.: US 10,139,710 B1
(45) Date of Patent: Nov. 27, 2018

(54) ADJUSTABLE ELECTRONIC DEVICE SUPPORT ASSEMBLY

(71) Applicants: Grant N. Marquette, Clearwater, MN (US); Wayne C. Marquette, Saint Michael, MN (US)

(72) Inventors: Grant N. Marquette, Clearwater, MN (US); Wayne C. Marquette, Saint Michael, MN (US)

( * ) Notice: Subject to any disclaimer, the term of this patent is extended or adjusted under 35 U.S.C. 154(b) by 0 days.

(21) Appl. No.: 16/023,088

(22) Filed: Jun. 29, 2018

(51) Int. Cl.
*G03B 17/56* (2006.01)
*F16M 11/24* (2006.01)

(52) U.S. Cl.
CPC ......... *G03B 17/561* (2013.01); *F16M 11/245* (2013.01)

(58) Field of Classification Search
None
See application file for complete search history.

(56) References Cited

U.S. PATENT DOCUMENTS

| | | | | |
|---|---|---|---|---|
| 3,959,803 | A * | 5/1976 | Marvel | G03B 17/52 396/340 |
| 7,953,316 | B1 * | 5/2011 | Mamaclay | G03B 17/568 206/316.2 |
| 9,280,036 | B2 * | 3/2016 | Kasahara | G03B 15/03 |
| 9,521,225 | B2 * | 12/2016 | Hattersley | H04M 1/72594 |
| 2011/0255855 | A1 * | 10/2011 | Lee | F16M 11/046 396/428 |
| 2012/0257370 | A1 * | 10/2012 | Yang | G03B 15/02 362/11 |
| 2016/0349597 | A1 * | 12/2016 | Chu | G03B 15/02 |

* cited by examiner

*Primary Examiner* — William B Perkey
(74) *Attorney, Agent, or Firm* — Dave Alan Lingbeck

(57) ABSTRACT

An adjustable electronic device support assembly for steadying and stabilizing an electronic device in particular when taking photos of selected objects. The adjustable electronic device support assembly includes a support member having an elongated top wall with a planar top side and also having a bottom side for supporting an electronic device upon the top wall and capable of taking photos.

15 Claims, 3 Drawing Sheets

ADJUSTABLE ELECTRONIC DEVICE SUPPORT ASSEMBLY

BACKGROUND OF THE INVENTION

Field of the Invention

The present invention relates to height adjustable supports and more particularly pertains to a new adjustable electronic device support assembly such as mobile phones for steadying and stabilizing an electronic device in particular when taking photos of selected objects.

Description of the Prior Art

The use of height adjustable supports is known in the prior art. More specifically, height adjustable supports heretofore devised and utilized are known to consist basically of familiar, expected and obvious structural configurations, notwithstanding the myriad of designs encompassed by the crowded prior art which have been developed for the fulfillment of countless objectives and requirements.

The prior art includes height adjustable table top lift mechanisms for supporting various devices While these devices fulfill their respective, particular objectives and requirements, the aforementioned patents do not disclose a new adjustable electronic device support assembly.

SUMMARY OF THE INVENTION

The general purpose of the present invention, which will be described subsequently in greater detail, is to provide a new adjustable electronic device support assembly which has many of the advantages of the height adjustable supports mentioned heretofore and many novel features that result in a new adjustable electronic device support assembly which is not anticipated, rendered obvious, suggested, or even implied by any of the prior art height adjustable supports, either alone or in any combination thereof. The present invention includes a support member having an elongated top wall with a planar top side and also having a bottom side for supporting an electronic device upon the top wall and capable of taking photos. None of the prior art includes the combination of the elements of the present invention.

There has thus been outlined, rather broadly, the more important features of the adjustable electronic device support assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new adjustable electronic device support assembly which has many of the advantages of the height adjustable supports mentioned heretofore and many novel features that result in a new adjustable electronic device support assembly which is not anticipated, rendered obvious, suggested, or even implied by any of the prior art height adjustable supports, either alone or in any combination thereof.

Still another object of the present invention is to provide a new adjustable electronic device support assembly for steadying and stabilizing an electronic device in particular when taking photos of selected objects.

Still yet another object of the present invention is to provide a new adjustable electronic device support assembly that allows a user to light up the object of which photos are being taken without producing black spots which would lessen the quality of the photos.

Even still another object of the present invention is to provide a new adjustable electronic device support assembly that allows the user to raise and lower the support assembly as desired for taking high quality photos of the selected object.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
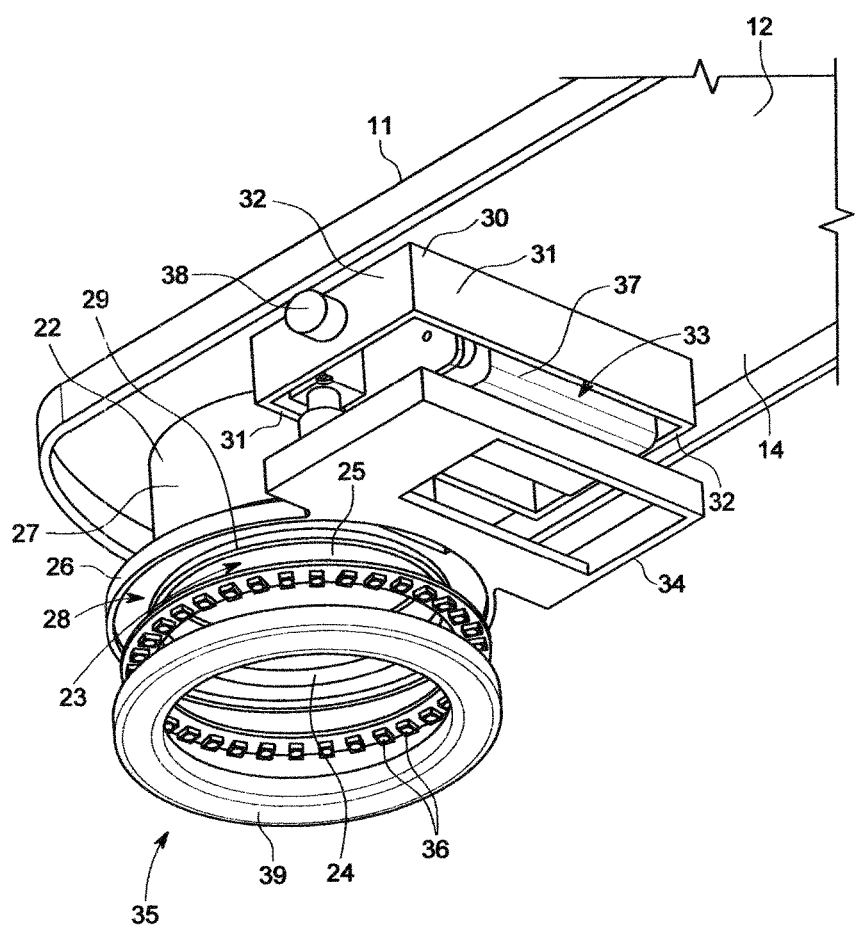
FIG. 1 is a bottom rear exploded perspective view of a new adjustable electronic device support assembly according to the present invention showing the support member.
Figure 2:
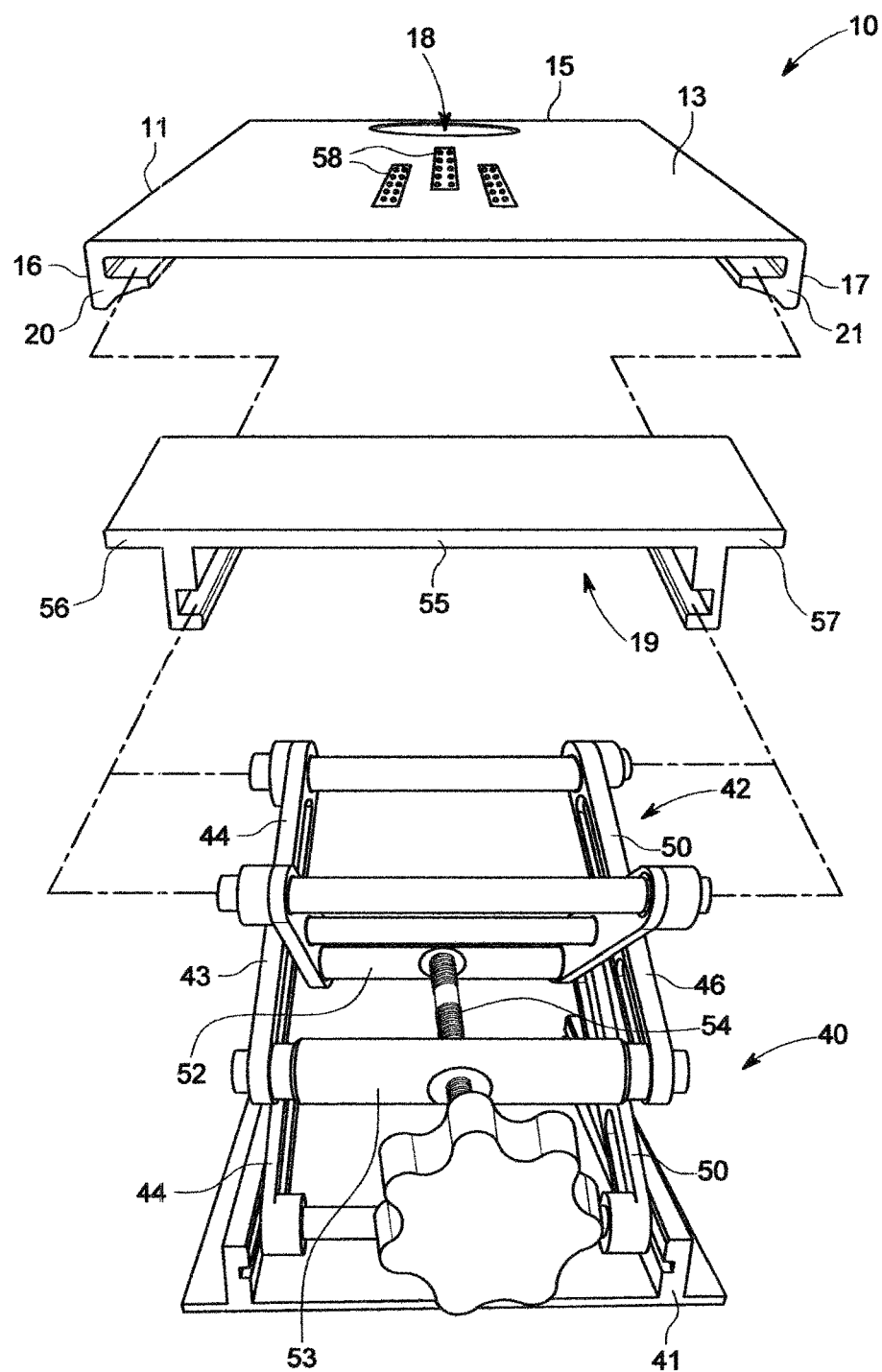
FIG. 2 is a top rear perspective view of the support member separated from the lift mechanism of the adjustable electronic device support assembly.
Figure 3:
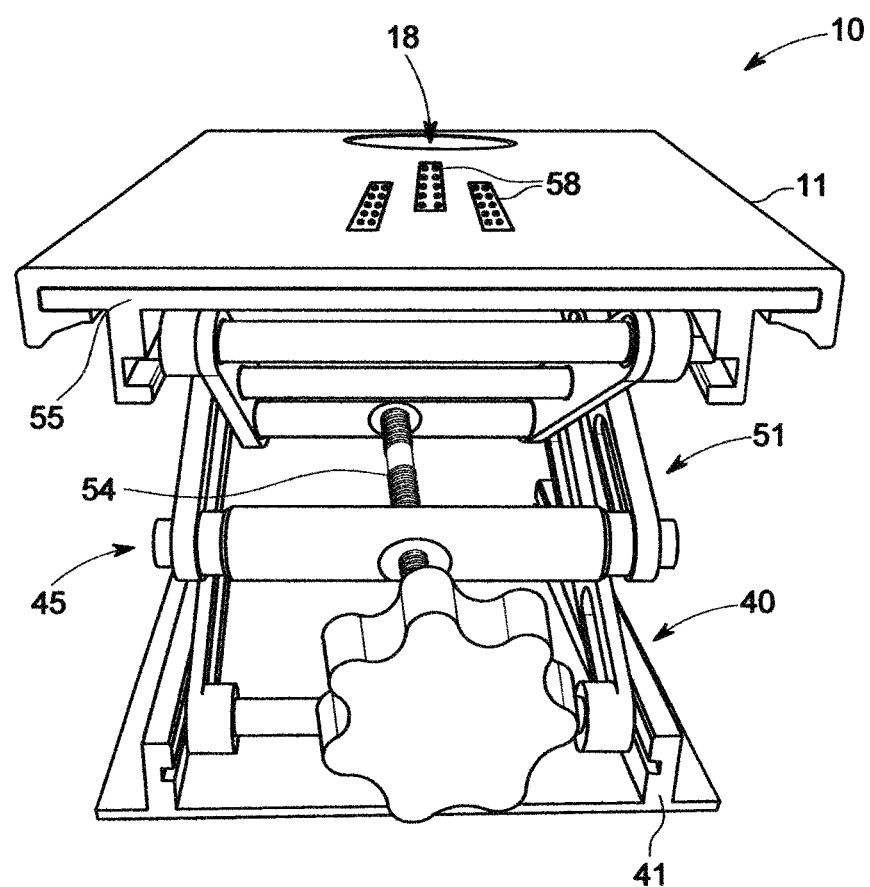
FIG. 3 is a top rear perspective view of the adjustable electronic device support assembly.

With reference now to the drawings, and in particular to FIGS. 1 through 3 thereof, a new adjustable electronic device support assembly embodying the principles and concepts of the present invention and generally designated by the reference numeral 10 will be described.

As best illustrated in FIGS. 1 through 3, the adjustable electronic device support assembly 10 generally may comprise a support member 11 having an elongated top wall 12 with a planar top side 13 and also having a bottom side 14 for supporting an electronic device upon the top wall 12 and capable of taking photos. The support member 11 includes side walls 16, 17 integrally depending from opposed longitudinal edges of the top wall 12 and also includes a front end 15 with an annular opening 18 disposed through the top wall 12 near the front end 15 for taking photos therethrough using the electronic device supported upon the top wall 12. The support member 11 includes strips of gripping, material 58 conventionally disposed upon the top side of the top wall 12 to prevent slipping of the electronic device supported upon the top wall 12. The support member 11 further includes a tubular portion 22 having a bore 23 disposed therethrough and being integral to and depending from the bottom side 14 of the top wall 112 and disposed about and aligned with the opening 18 and having a bottom end 24. The tubular portion 22 has a ring portion 26 integrally disposed about the tubular portion 22 at the bottom end 24 and having a bottom side 27 with a recessed portion 28 disposed therein.

The electronic device support assembly 10 may further comprise a light-emitting assembly 35 including light-emitting members 36 conventionally coupled to the support member 11 and including a power source 37 in conventional and operable communication with the light-emitting members 36. The light-emitting members 36 are conventionally disposed in the recessed portion 28 and spaced along and about the ring portion 26. The power source 26 includes a battery and a brightness switch 38 conventionally supported upon the support member 11 and being in conventional and operable communication with the battery 26 and the light-emitting members 36. The light-emitting assembly 35 also includes a transparent light diffusing cover 39 conventionally and removably disposed over the light-emitting members 36. The tubular portion 22 has an inner side 25 forming the bore 23 and a light-shielding portion 29 flush and integral with the inner side 25 of the tubular portion 22 and extending downwardly from the bottom end 24 to prevent the light-emitting members 36 from shining black spots upon a selected object. The support member 11 also includes a battery compartment 30 conventionally depending from the bottom side 14 of the support member 11 with the battery compartment 30 having side and end walls 31, 32 and an open bottom 33 with a replaceable bottom cover 34 conventionally disposed over the open bottom 33. The battery 37 is removably disposed through the open bottom 33 of the battery compartment 30.

The electronic device support assembly 10 may also comprise a lift mechanism 40 including a base 41 and a height adjustable assembly 42 conventionally supported upon the base 41. The height adjustable assembly 42 includes a pair of height adjustable members 43, 46, cross members 52, 53 conventionally interconnecting the height adjustable members 43, 46 and an elongated threaded actuator 54 threaded through the cross members 52, 53 to raise and lower the height adjustable members 43, 46. Each of the height adjustable members 43 includes levers 44, 50 pivotally and conventionally connected to one another and forming a scissors arrangement 45, 51 with the cross members 52, 53 conventionally interconnecting the height adjustable members 43, 46. The support member 11 is conventionally supported upon the height adjustable members 43, 46 with the opening 18 through the support member 11 being horizontally disposed beyond and outside the height adjustable members 43, 46 and the base 41 so that the selected object placed adjacent the base 41 is vertically aligned with the opening 18 through the support member 11. The lift mechanism 40 includes a platform 55 conventionally mounted upon the height adjustable members 43, 46. The support member 11 also has an open back end 19 and flanges 20, 21 integral to bottom edges of the side walls 16, 17 and spaced from and parallel to the top wall 12 and disposed inwardly of the support member 11 and extending selected lengths along the side walls 16, 17 from the open back end 19. The support member 11 is removably and conventionally mounted upon the platform 55 with longitudinal edge portions 56, 57 of the platform 55 being removably received through the open back end 19 and between the flanges 20, 21 and the top wall 12 to secure the support member 11 to the platform 55.

As to a further discussion of the manner of usage and operation of the present invention, the same should be apparent from the above description. Accordingly, no further discussion relating to the manner of usage and operation will be provided.

In use, a user positions the lift mechanism 40 upon a flat surface and positions the object to be viewed and of which photos are to be taken adjacent to the base 41 and vertically aligned with the opening 18 through the support member 11. The user positions the electronic device such as a camera or cell phone upon the top wall 12 and upon the strips of gripping material 58 with the lens positioned over the opening 18 through the support member 11, and adjusts the height of the lift mechanism 40 as desired and snaps a picture of the object. After doing so, the user removes the electronic device and contracts the lift mechanism 40.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the adjustable electronic device support assembly. Further, since numerous modifications and changes will readily occur to those skilled in the art, it is not desired to limit the invention to the exact construction and operation shown and described, and accordingly, all suitable modifications and equivalents may be resorted to, falling, within the scope of the invention.

We claim:

1. An adjustable electronic device support assembly comprising:
   a support member having an elongated top wall with a planar top side and also having a bottom side for supporting an electronic device upon the top wall and capable of taking photos, wherein the support member includes side walls depending from opposed longitudinal edges of the top wall and also includes a front end with an annular opening disposed through the top wall near the front end for taking photos therethrough using the electronic device supported upon the top wall, wherein the support member includes strips of gripping material disposed upon the top side of the top wall to prevent slipping of the electronic device supported upon the top wall.

2. An adjustable electronic device support assembly comprising:
   a support member having an elongated top wall with a planar top side and also having, a bottom side for supporting an electronic device upon the top wall and capable of taking photos, wherein the support member includes side walls depending from opposed longitudinal edges of the top wall and also includes a front end with an annular opening disposed through the top wall near the front end for taking photos therethrough using the electronic device supported upon the top wall, wherein the support member further includes a tubular portion having a bore disposed therethrough and being integral to and depending from the bottom side of the top wall and disposed about and aligned with the opening and having a bottom end.

3. The adjustable electronic device support assembly as described in claim 2, wherein the tubular portion has a ring portion integrally disposed about the tubular portion at the bottom end and having an outer side with a recessed portion disposed therein.

4. The adjustable electronic device support assembly as described in claim 3 further includes a light-emitting assembly including light-emitting members coupled to the support member and including a power source in operable communication with the light-emitting members.

5. The adjustable electronic device support assembly as described in claim 4, wherein the light-emitting members are disposed in the recessed portion and spaced along and about the ring portion.

6. The adjustable electronic device support assembly as described in claim 4, wherein the power source includes a battery and a brightness switch supported upon the support member and being in operable communication with the battery and the light-emitting members.

7. The adjustable electronic device support assembly as described in claim 5, wherein the light-emitting assembly also includes a transparent light diffusing cover removably disposed over the light-emitting members.

8. The adjustable electronic device support assembly as described in claim 4, wherein the tubular portion has an inner side forming the bore and a light-shielding portion flush with the inner side of the tubular portion and extending downwardly from the bottom end to prevent the light-emitting members from shining, black spots upon a selected object.

9. The adjustable electronic device support assembly as described in claim 2, wherein the support member also includes a battery compartment depending from the bottom side of the support member with the battery compartment having side and end walls and an open bottom with a replaceable bottom cover disposed over the open bottom, wherein the battery is removably disposed through the open bottom of the battery compartment.

10. The adjustable electronic device support assembly as described in claim 2 further includes a lift mechanism including a base and a height adjustable assembly supported upon the base, wherein the height adjustable assembly includes a pair of height adjustable members, cross members and an elongated threaded actuator threaded through the cross members to raise and lower the height adjustable members.

11. The adjustable electronic device support assembly as described in claim 10, wherein each of the height adjustable members includes levers pivotally connected to one another and forming a scissors arrangement with the cross members interconnecting the height adjustable members.

12. The adjustable electronic device support assembly as described in claim 11, wherein the support member is supported upon the height adjustable members with the opening through the support member being horizontally disposed beyond and outside the height adjustable members and the base so that the selected object placed adjacent the base is vertically aligned with the opening through the support member.

13. The adjustable electronic device support assembly as described in claim 12, wherein the lift mechanism includes a platform mounted upon the height adjustable members.

14. The adjustable electronic device support assembly as described in claim 13, wherein the support member also has an open back end and flanges integral to bottom edges of the side wall and spaced from and parallel to the top wall and disposed inwardly of the support member and extending selected lengths along the side walls from the open back end.

15. The adjustable electronic device support assembly as described in claim 14, wherein the support member is removably mounted upon the platform with longitudinal edge portions of the platform being removably received through the open back end and between the flanges and the top wall to secure the support member to the platform.

* * * * *